United States Patent [19]

Rosati

[11] 3,766,492

[45] Oct. 16, 1973

[54] LASER PUMPING SYSTEM

[75] Inventor: Vincent J. Rosati, Oakhurst, N.J.

[73] Assignee: The United States of America as represented by the Secretary of the Army

[22] Filed: July 25, 1972

[21] Appl. No.: 275,026

[52] U.S. Cl. ............................................. 331/94.5
[51] Int. Cl. ............................................. H01s 3/09
[58] Field of Search ................................. 331/94.5; 315/240–243

[56] References Cited
UNITED STATES PATENTS

| 3,341,708 | 9/1967 | Bilderback | 331/94.5 |
| 3,351,870 | 11/1967 | Goldsmith et al. | 331/94.5 |
| 3,430,159 | 2/1969 | Roeber | 331/94.5 |
| 3,515,938 | 6/1970 | Morse | 331/94.5 |
| 3,178,657 | 4/1965 | Morse | 331/94.5 |

Primary Examiner—William L. Sikes
Attorney—Harry M. Saragovitz et al.

[57] ABSTRACT

A circuit for pumping laser materials that require relatively long pump pulses wherein a series of short, closely spaced pulses are provided that synthesize the conventional single rectangular pump pulse.

16 Claims, 3 Drawing Figures

LASER PUMPING SYSTEM

SUMMARY OF THE INVENTION

A circuit for pumping such laser materials as erbium require, for reasonable efficiency, a relatively long pump pulse, for example, of about 2 to 3 milliseconds duration. Previous techniques for attaining such long pump pulses have required high values of inductance and capacitance and, consequently, components which are too heavy and bulky. Instead of energizing the laser pump source with a single, long pulse, the pumping circuit of the invention provides a train of short, closely spaced pulses which, because of the relatively long fluorescent decay time of erbium, can provide an integration of the energy stored in the erbium ions until the laser threshold is attained. The small interpulse spacing allows only very little fluorescence loss between pulses.

Ordinarily, high values of inductance and capacitance have been required to produce a pulse sufficiently long to allow $Er^{+3}$ ions in erbium-doped lasers to attain the population inversion necessary for lasing. This is not true for some other lasers, such as neodymium-doped YAG or neodymium-doped glass lasers, which require only short pump pulses. Erbium-doped lasers are characterized by a relatively long fluorescent decay period. Specifically, about 14 milliseconds is required for the number $N_u$ of ions originally in the upper energy level to be reduced to $e^{-1}N_u$; over a period of, say, 50 microseconds, the change in population is relatively small.

The energy transfer scheme used in erbium lasers uses sensitizing ions, such as ytterbium ions, which efficiently absorb optical pump radiation and transfer it to the erbium ions. That is, the ytterbium ions absorb pump light directly from the flashlamp and are raised to an excited state. The excited ytterbium ions then transfer their energy to the erbium in about ½ millisecond, thereby raising the erbium ions to an excited state. This relatively long transfer time is the reason for the long pump pulse requirement. To obtain the necessary pump pulse length the pulse forming network normally consists of a capacitance of about 1,000 microfarads and an inductance of 1 millihenry. Such components obviously are much too heavy and bulky for portable laser equipments. The weight and size of the coil can be decreased by using fine wire, but this results in a large increase in resistance, causing ohmic losses to become excessive. By pumping the laser with a series of short pulses, the values of inductance and capacitance required for the pulse forming network inductor and pulse forming network capacitor can be reduced to only 60 microhenries and 10 microfarads, respectively.

DESCRIPTION OF THE PREFERRED EMBODIMENT

Figure 1:
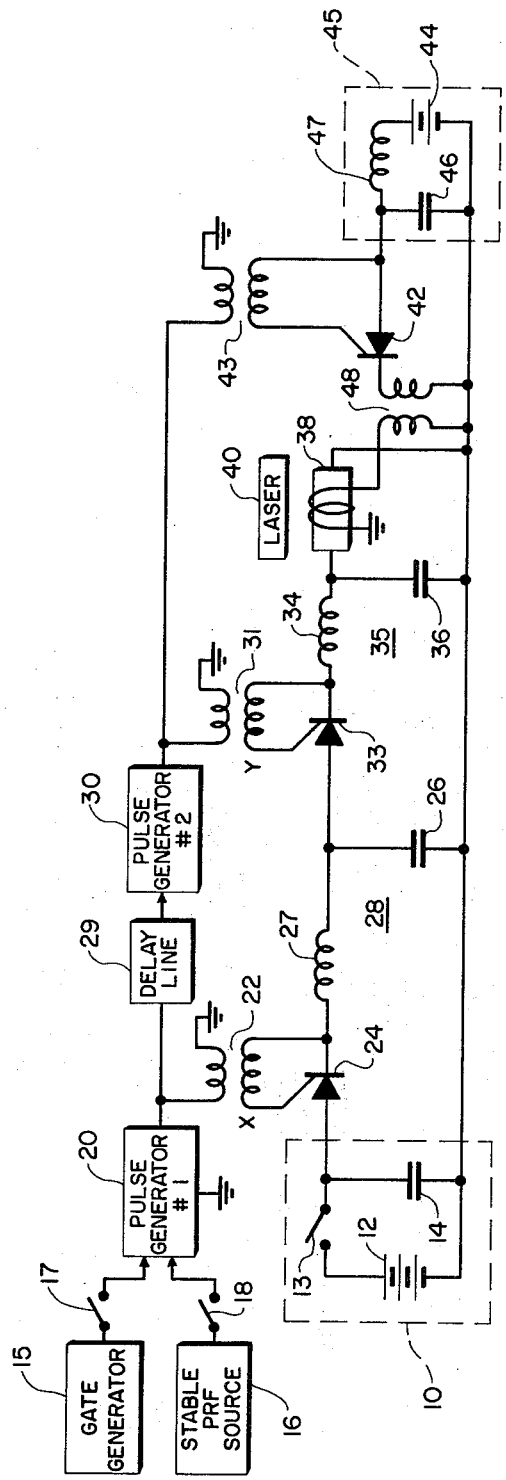
FIG. 1 is a circuit diagram showing a first embodiment of a laser pumping circuit according to the invention.

Referring to FIG. 1, a power supply 10 is shown which includes a battery 12 or other unidirectional voltage source. The circuit may be readied for operation by closing switch 13 to charge a power supply capacitor 14.

The command for firing the laser is initiated by connecting the output of a gate generator 15 and the output of a stable pulse source 16 of fixed pulse repetition frequency to first pulse generator 20 by way of respective switches 17 and 18. The pulse generator 20 then is turned on and a short pulse is produced thereby; this output pulse is applied by way of transformer 22 to the gate of a first silicon controlled rectifier 24 to fire this silicon controlled rectifier. The charge previously built up on the relatively large storage capacitor 14 in power supply 10 can now be transferred through silicon controlled rectifier 24 to a charging capacitor 26 which, together with a charging inductor 27, forms a resonant charging circuit 28. After a short delay, accomplished by means of a delay line 29 in the output circuit of pulse generator 20, the pulse from first pulse generator 20 turns on a second pulse generator 30. The output from pulse generator 30 then is coupled by way of transformer 31 to the gate of a silicon controlled rectifier 33 and fires the latter. The delay time of the output pulse from the second pulse generator 30 relative to that from the first pulse generator 20 is adjusted to be slightly greater than the time taken for the charging capacitor 26 to be fully charged from the power supply 10. Furthermore, the delay interval must be less than the interval between the pulses from pulse generator 20.

Conduction of the silicon controlled rectifier 33 results in the charge in the charging capacitor 26 being dumped through the discharge coil 34 of a second resonant charging circuit 35 into the capacitor 36. This second resonant charging circuit, in addition to providing a charging current to keep silicon controlled rectifier 33 open, also performs a second voltage doubling function. This current flow in resonant charging circuit 35 passes through the already pre-ionized flashlamp 38. The discharge of the flashlamp 38 generates a short light burst for pumping the laser 40. A typical value of the period of the flashlamp optical pulse is about 100 microseconds.

The output from the second pulse generator 30 triggers the silicon controlled rectifier 42 via pulse transformer 43 and when the silicon controlled rectifier 42 conducts, the energy from battery 44 of lamp triggering power supply 45 stored in the capacitor 46 is dumped through flashlamp trigger transformer 48. The capacitor 46, in combination with coil 47, forms a resonant charging circuit. The high voltage from across the secondary of transformer 48 causes the flashlamp 38 to be pre-ionized, but at an energy level below that necessary for pumping the laser 40.

It is possible to provide circuit means whereby the pulse applied to transformer 43 in FIG. 1 arrives prior to the pulse at transformer 31. However, this manner of maintaining the silicon controlled rectifier 33 open is more readily achieved by means of the circuit 33, 34, 36 already described and, in addition, an additional voltage doubling is achieved as a secondary effect.

Shortly after firing of the flashlamp 38, the current drain by the flashlamp causes the voltage across capacitors 26 and 36 to decrease until, finally, the flashlamp is shut off. However, there are still some ions which take time to recombine and during a period immediately following cessation of the light burst, the flashlamp 38 still is a current carrier. To prevent further damping of the charge on capacitors 26 and 36 through the conducting path of the flash tube during this period immediately after the laser pumping has been discontinued, the discharge circuit 26, 33, 34, 36 is designed to operate slightly underdamped and reverse current flow is prevented by the silicon controlled rectifier diode 33. The degree of underdamping is achieved actually by proper adjustment of the size of the coil 34. As soon as the current through the silicone controlled rectifier 33 falls below its holding level, the silicon controlled rectifier 33 stops conducting. When the next pulse is generated by the stable pulse source 16, another cycle is initiated, assuming that the gate pulse is still supplying its pulse to the first pulse generator 20. The charge-discharge cycle is finally terminated by opening switch 17, thereby removing the gate pulse from the pulse generator circuit 20. A train of 100 microsecond pulses of the order of 5 milliseconds long has been achieved in practice, with an energy per pulse of about 2 joules.

Figure 2:
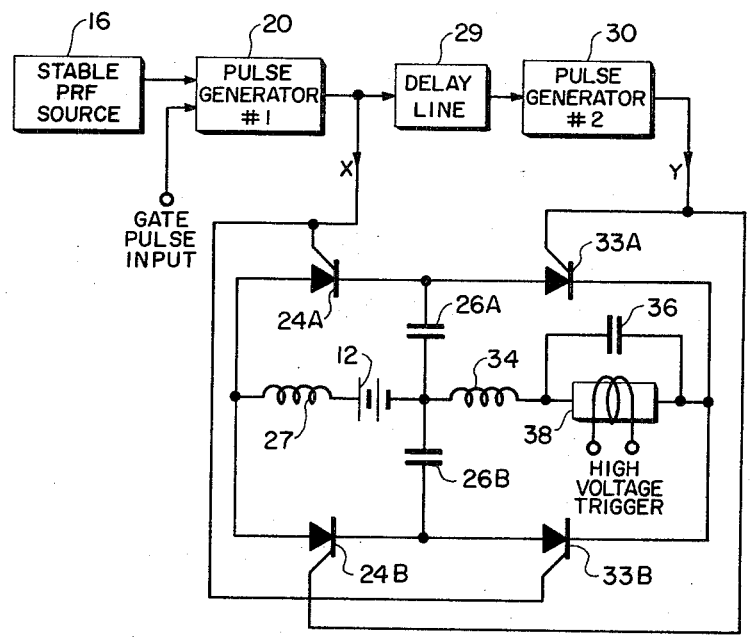
FIG. 2 is a circuit diagram of a second embodiment of a laser pumping circuit of the invention wherein the interval between flashlamp pulse is reduced by incorporation of a second set of silicon controlled rectifiers and an additional pulse forming network capacitor.

In order to minimize the dead time between individual pulses in the pulse circuit of FIG. 1, the circuit of FIG. 2 has been developed. The components of FIG. 2 corresponding to those in the circuit of FIG. 1 are represented by the same reference characters or by the same reference characters modified by the addition of the capital letter A.

If one assumes all capacitive elements to be initially discharged, a pulse output at X from pulse generator 20 will open silicon controlled rectifier 24A and permit capacitor 26A to charge from source 12. Simultaneously, silicon controlled rectifier 33A is open, but capacitor 26B, is uncharged.

When the pulse output Y from pulse generator 30 appears shortly after the pulse output X, silicon controlled rectifier 33A is open and capacitor 26A discharges through the resonant circuit 34, 26A and the flashlamp 38. While capacitor 26A is discharging, silicon controlled rectifier 24B is open and capacitor 26B is charged from the source 12. When the next pulse output X occurs (that is, during the next pulse from stable pulse source 16), the capacitor 26A again charges and a new cycle is initiated. The small dead time required to turn on the silicon controlled rectifier is made negligible by the circuit arrangement of FIG. 2.

Figure 3:
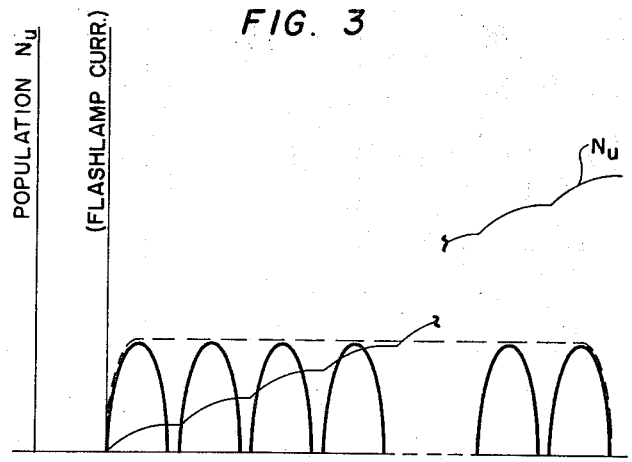
FIG. 3 is a plot showing a typical input pulse train to the laser pump lamp and its correspondence with the number of pumped ions in the erbium-doped laser medium.

In FIG. 3, an explanation of laser pumping is shown. The individual lamp current pulses supplied to pump lamp 38 of FIG. 2 are shown. The envelope that is being synthesized is indicated in FIG. 3 in dotted lines. The period of this synthesized envelope may be of the order of 3 milliseconds and may comprise, for example, 30 separate pulses, each having a pulse width of the order of 100 microseconds. The lamp current pulses can be derived alternately from the charge on capacitor 26A and from the charge on capacitor 26B in the circuit of FIG. 2. The pump lamp flux irradiating the laser 40 is approximately proportional to the square of the lamp current during each discharge cycle.

Because of the relatively small fluorescent decay in the short interval (approximately 10 microseconds) between individual pulses, one can achieve an integration of the energy stored in the erbium ions until such time as the lasing threshold is reached. The relationship between population $N_u$ and time is shown in FIG. 3 and is almost linear.

What is claimed is:

1. A laser pumping circuit for a laser requiring a relatively long optical pump pulse period, comprising a laser pumping means, power supply means, first and second electronically controlled rectifiers, energy storage means, means for initiating first electrical pulses occurring at a selected pulse repetition rate, said first controlled rectifier being responsive to each said first electrical pulses for transferring energy from said power supply means to said energy storage means, means for initiating second electrical pusles each delayed by a preset time interval with respect to the corresponding first electrical pulses, said second controlled rectifier being responsive to said second electrical pulses for transferring at least a portion of the energy stored in said storage means to said laser pumping means.

2. A laser pumping circuit according to claim 1 wherein said storage means forms a portion of a resonant charging circuit.

3. A laser pumping circuit according to claim 2 wherein said transferred energy is supplied to said laser pumping means by way of an additional resonant charging circuit.

4. A laser pumping circuit according to claim 1 wherein said transferred energy is supplied to said laser pumping means by way of a resonant charging circuit.

5. A laser pumping circuit according to claim 1 further including means for pre-ionizing said laser pumping means.

6. A laser pumping circuit according to claim 5 wherein said pre-ionizing means is responsive to said second electrical pulses.

7. A laser pumping circuit according to claim 1 wherein said delay time interval is slightly greater than the time taken for said storage means to be fully charged from said power supply means.

8. A laser pumping circuit according to claim 1 wherein said delay time interval is less than the pulse repetition rate.

9. A laser pumping circuit according to claim 1 wherein said energy storage means includes first and second capacitive means, said first controlled rectifier means responding to said first electrical pulse for transferring energy from said power supply to one of said capacitive means and for transferring energy stored in the other of said capacitive means to said laser pumping means, and said second controlled rectifier means responding to said second electrical pulses for transferring energy from said power supply to said other capacitive means and for transferring energy stored in said one capacitive means to said laser pumping means.

10. A laser pumping circuit according to claim 9 further including means for pre-ionizing said laser pumping means.

11. A laser pumping circuit according to claim 9 wherein said storage means forms a portion of a resonant charging circuit.

12. A laser pumping circuit according to claim 11 wherein said transferred energy is supplied to said laser pumping means by way of an additional resonant charging circuit.

13. A laser pumping circuit according to claim 9 wherein said transferred energy is supplied to said laser pumping means by way of a resonant charging circuit.

14. A laser pumping circuit according to claim 13 further including means for pre-ionizing said laser pumping means.

15. A laser pumping circuit according to claim 9 wherein each of said controlled rectifier means includes a controlled rectifier connected in circuit with said power supply means and a controlled rectifier connected in circuit with said laser pumping means.

16. A laser pumping circuit according to claim 15 further including means for pre-ionizing said laser pumping means.

* * * * *